United States Patent [19]

Nudelman et al.

[11] 4,255,201
[45] Mar. 10, 1981

[54] RAW MIXTURE FOR THE PRODUCTION OF CEMENT CLINKER

[75] Inventors: Boris I. Nudelman; Anatoly Y. Gadaev; Marsel Y. Bikbau; Petr T. Shishkin, all of Tashkent, U.S.S.R.

[73] Assignee: Tashkentsky Nauchno-Issledovatelsky I Proektny Institut Stroitelnykh Materilov "Niistromproekt", Tashkent, U.S.S.R.

[21] Appl. No.: 64,107

[22] Filed: Aug. 6, 1979

Related U.S. Application Data

[62] Division of Ser. No. 804,268, Jun. 7, 1977, Pat. No. 4,179,302.

[30] Foreign Application Priority Data

Aug. 20, 1976 [SU] U.S.S.R. .............................. 2400246

[51] Int. Cl.³ ................................................ C04B 7/36
[52] U.S. Cl. ................................................ 106/106
[58] Field of Search .................. 106/89, 100, 103, 104

[56] References Cited
U.S. PATENT DOCUMENTS

| | | | |
|---|---|---|---|
| 3,628,973 | 12/1971 | Greening et al. | 106/100 |
| 3,782,992 | 1/1974 | Uchikawa et al. | 106/89 |
| 3,864,138 | 2/1975 | Uchikawa et al. | 106/89 |
| 3,942,994 | 3/1976 | Murray et al. | 106/104 |
| 3,947,283 | 3/1976 | Uchikawa et al. | 106/104 |
| 4,028,126 | 6/1977 | Mori et al. | 106/104 |

*Primary Examiner*—James Poer
*Attorney, Agent, or Firm*—Robert E. Burns; Emmanuel J. Lobato; Bruce L. Adams

[57] ABSTRACT

A raw mixture for the production of a cement clinker which consists of lime, argillaceous and ferrous components and a mixture of chlorides of calcium, potassium and sodium, the components being contained in the following proportions, percent by mass:

lime component: 55 to 63
  argillaceous component: 23 to 17
  ferrous component: 4 to 1
  calcium chloride: 17.8 to 4
  potassium chloride: 0.1 to 7.5
  sodium chloride: 0.1 to 7.5.

The raw mixture is useful in the low-temperature processes for production of cement. The use of the raw mixture according to the present invention makes it possible to utilize alkali-containing raw materials (soda production wastes, cement dust recycle).

8 Claims, No Drawings

RAW MIXTURE FOR THE PRODUCTION OF CEMENT CLINKER

This is a divisional, of application Ser. No. 804,268, filed June 7, 1977, now U.S. Pat. No. 4,179,302.

BACKGROUND OF THE INVENTION

The present invention relates to cement industry and, more specifically, to raw mixtures for the production of a cement clinker and is adapted to be used in low-temperature methods of production of a cement clinker.

Known in the art are raw mixtures for the production of a cement clinker which mixtures consist of lime, clay and ferrous components. In particular, a raw mixture is known consisting of the following components, percent by mass:

lime component (limestone): 79.54
argillaceous component (clay): 18.55
ferrous component (cinder): 1.91

(cf. Yu. M. Boutt, V. V. Timashev "Practicum of Chemical Technology of Binding Materials," Moscow, "Vysshaja Shkola" (Higher School) Publishing House, 1973).

This raw mixture is typical for the raw mixtures employed in the production of a portland-cement clinker. A disadvantage of such raw mixtures in the production of cement resides in high temperatures of clinker calcination (1,400° to 1,500° C.) and a considerable specific fuel consumption.

Also known in the art are raw mixtures (cf. USSR Inventor's Certificate No. 275,821 published July 3, 1970 in Bulletin No. 22; USSR Inventor's Certificate No. 326,152 published Jan. 19, 1972, Bulletin No. 4) containing lime and acidic (argillaceous and ferrous) components and calcium chloride in an amount of from 10 to 20% by mass. The ratio between limestone and acidic components is selected so as to obtain a raw mixture with the saturation coefficient (SC) of 0.9 with the account of $CaCl_2$ and 0.7 without $CaCl_2$.

The raw mixtures disclosed in the Inventor's Certificates referred to make it possible to lower the temperature of clinker calcination down to 900°-1,200° C., as well as to reduce the specific fuel consumption and to increase the grindability of clinker. However, in the production of a cement clinker the use of the raw mixtures referred to does not provide for utilization of alkali-containing raw materials and, in particular, alkali-containing dust recycle.

SUMMARY OF THE INVENTION

It is an object of the present invention to provide such a composition of a raw mixture for the production of cement clinker which would enable utilization of alkali-containing raw materials and intensification of the process of elimination of residual chlorides from cement clinker.

This object is accomplished by the provision of a raw mixture for the production of cement clinker consisting of lime, argillaceous and ferrous components and a mixture of chlorides of calcium, potassium and sodium, wherein, in accordance with the present invention said components are contained in the following proportions, percent by mass:

lime component: 55 to 63
argillaceous component: 23 to 17
ferrous component: 4 to 1
calcium chloride: 17.8 to 4
potassium chloride: 0.1 to 7.5
sodium chloride: 0.1 to 7.5.

The raw mixture for the production of cement clinker according to the present invention is prepared by way of separately or simultaneously milling the starting components and intermixing thereof (in the case of separate grinding). Said grinding can be performed either in the presence of water (wet grinding) or without it (dry grinding). In the case of wet grinding of the starting components, chlorides can be introduced both in the form of dry compounds and in the form of aqueous solutions of chlorides of appropriate concentrations. In all cases, in wet grinding 25-35% of water or an aqueous solution of chlorides (as calculated per total mass of the starting components) is added to the starting components. A 10 to 50% aqueous solution of chlorides can be used.

The raw mixture in the form of raw flour resulting from dry grinding can be granulated with the addition of water in an amount of from 6 to 9% to give granules with a diameter of from 5 to 20 mm. The raw mixture in the form of raw flour, granules or slurry (the raw mixture with water) is fed into a furnace, wherein it is calcined at a temperature within the range of from 1,000° to 1,200° C. The resulting cement clinker is then cooled.

The above-given proportions of the raw mixture components comprising raw materials widely employed in the cement industry are selected so that the final product-cement contains a highly-basic silicate, a low-basic silicate, aluminate and alumoferrite of calcium in such a ratio which enables production of cement with a compression strength after 28 days of hardening of from 400 to 520 $kgf/cm^2$.

The presence of chlorides of calcium, potassium and sodium in the raw mixture according to the present invention considerably intensifies processes of decarbonization of the starting materials, accelerates formation of the liquid phase serving as the principal reaction medium, wherein reactions of mineral-formation occur at a temperature within the range of from 1,000° to 1,200° C. At the same time, the presence, along with calcium chloride, of chlorides of potassium and sodium possessing a higher volatility facilitates a more intensive removal of residual chlorides during the process of clinker-formation.

Furthermore, the present invention makes it possible to utilize alkali-containing raw materials in the form of chlorine-containing argillaceous and calcareous rocks, such as loess loam, feldspar rocks, wastes from the production of soda, alkali-containing dust recycle, etc.

For a better understanding of the present invention the following Examples illustrating its embodiments are given hereinbelow.

EXAMPLE 1

A raw mixture is prepared consisting of the following components, percent by mass:

lime component (limestone): 55.0
argillaceous component (loess loam): 23.0
ferrous component (pyrite cinders): 4.0
calcium chloride (commercial): 17.8
potassium chloride (commercial): 0.1
sodium chloride (commercial): 0.1.

Said starting components have the following chemical composition, percent by mass:

| Component | Losses upon calcination | SiO$_2$ | Al$_2$O$_3$ | Fe$_2$O$_3$ | CaO | MgO | Others |
| --- | --- | --- | --- | --- | --- | --- | --- |
| Limestone | 41.50 | 3.38 | 1.30 | 0.32 | 52.76 | 0.10 | 0.52 |
| Loess loam | 13.38 | 51.24 | 12.18 | 4.71 | 12.08 | 2.23 | 4.19 |
| pyrite cinders | 6.55 | 9.09 | 1.55 | 73.26 | 4.11 | — | 5.50 |
| Calcium chloride | | | | 96% by mass of the principal compound | | | |
| Potassium chloride | | | | 99.8% by mass of the principal compound | | | |
| Sodium chloride | | | | 99.8% by mass of the principal compound. | | | |

Limestone is disintegrated by wet grinding in the presence of 25% of water to a residue of not more than 10% on a sieve with holes of the diameter of 80 mcm. The resulting calcareous slurry is mixed with loess slurry, which is prepared in a manner similar to that of the calcareous slurry preparation, in the weight ratio of 2.4:1 respectively.

Into the lime-loess slurry an additive is introduced consisting of calcium chloride, pyrite cinders, potassium chloride and sodium chloride at the following weight ratios between the slurry and the additive components (calculated per solids): 78:17.8:4.0:0.1:0.1.

The resulting slurry is fed into a rotating furnace, wherein it is calcined at a temperature within the range of from 1,050° to 1,150° C. The resulting cement clinker is cooled in an air-cooler and then delivered to grinding to a residue of not more than 10% on a sieve with the hole diameter of 80 mcm. The calcined cement clinker contains, according to the data of X-ray quantitative analysis and optic microscopy, the following amounts of the components, percent by mass:
  highly-basic calcium silicate: 55 to 50
  low-basic calcium silicate: 35 to 30
  calcium aluminate and alumoferrite: 10 to 20.

Chemical analysis of the calcined cement clinker shows the substantially total absence of free calcium oxide. The cement clinker has the following chemical composition, percent by mass (as calculated for the oxides):
  SiO$_2$: 22.93
  Al$_2$O$_3$: 5.74
  Fe$_2$O$_3$: 6.50
  CaO: 63.84
  MgO: 0.99.

Tests for binding properties of the cement produced from the thus-prepared raw mixture have shown that compression strength of standard samples after 28 of hardening 460 kgf/cm$^2$.

EXAMPLE 2

A raw mixture is prepared consisting of the following components, percent by mass:
  lime component: 63.0
  argillaceous component (loess loam): 17.0
  ferrous component (pyrite cinders): 1.0
  calcium chloride (commercial): 4.0
  potassium chloride (commercial): 7.5
  sodium chloride (commercial): 7.5.

Said raw components have the same chemical composition as in the foregoing Example 1.

Lime is ground by wet grinding to a residue of 10% on a sieve with the hole diameter of 80 mcm. Similarly ground loess loam, pyrite cinders as well as dry chlorides are intermixed and the mixture is homogenized. The resulting raw flour is calcined (with previous decarbonization in a thermal unit) at a temperature within the range of from 1,000° to 1,100° C.

The thus-produced cement clinker is cooled in an air-cooler, delivered to grinding to a residue of not more than 10% on a sieve with the hole diameter of 80 mcm.

The calcined cement clinker contains, according to the X-ray analysis data and optical microscopy, the following amounts of the components, percent by mass:
  highly-basic calcium silicate: 75 to 70
  low-basic calcium silicate: 15 to 20
  calcium aluminate and alumoferrite: 20 to 10.

Chemical analysis of the calcined clinker shows practically total absence of free calcium oxide. The cement clinker has the following chemical composition as calculated for the oxides, percent by mass:
  SiO$_2$: 22.19
  Al$_2$O$_3$: 4.70
  Fe$_2$O$_3$: 3.28
  CaO: 69.0
  MgO: 0.83.

Tests of binding properties of the cement produced from the above-described raw mixture have shown that the compression strength of standard samples after 28 days of hardening is 520 kgf/cm$^2$.

EXAMPLE 3

A raw mixture is prepared consisting of the following components, percent by mass:
  lime component (limestone): 59.0
  argillaceous component (loess loam): 17.0
  ferrous component (pyrite cinders): 2.5
  calcium chloride (commercial): 8.9
  potassium chloride (commercial): 6.8
  sodium chloride (commercial): 5.8.

Said starting components have the same chemical composition as in Example 1 hereinbefore.

Lime and other components are ground and the raw mixture is prepared in the form of a raw flour in a manner similar to that described in the foregoing Example 2.

The resulting raw flour is granulated and fed into a rotary furnace, wherein it is calcined at a temperature within the range of from 1,100° to 1,150° C. The resulting cement clinker is cooled and delivered to grinding to a residue of not more than 10% on a sieve with the hole diameter of 80 mcm.

The calcined cement clinker contains, according to the X-ray and optical microscopy analysis data, the following amounts of the components, percent by mass:
  highly-basic calcium silicate: 40 to 45
  low-basic calcium silicate: 40 to 45
  calcium aluminate and alumoferrite: 20 to 10.

Chemical analysis of the calcined cement clinker shows the practically total absence of free calcium oxide. The cement clinker has the following composition as calculated for the oxides, percent by mass:
  SiO$_2$: 24.4
  Al$_2$O$_3$: 5.93
  Fe$_2$O$_3$: 5.40
  CaO: 63.36
  MgO: 0.91.

Tests of binding properties of the cement produced from this raw mixture have shown that compression strength of standard samples after 28 days of hardening is 420 kgf/cm$^2$.

EXAMPLE 4

A raw mixture is prepared consisting of the following components, percent by mass:
  lime component (limestone): 63
  argillaceous component (clay): 22
  ferrous component (copper-smelting slag): 4
  calcium chloride (commercial): 8
  potassium chloride (commercial): 2
  sodium chloride (commercial): 1.

Said starting components have the following chemical composition, percent by mass:

| Component | Losses upon calcination | $SiO_2$ | $Al_2O_3$ | $Fe_2O_3$ | FeO | CaO | MgO | Others |
|---|---|---|---|---|---|---|---|---|
| Limestone | 41.00 | 4.80 | — | 0.79 | — | 52.44 | 0.58 | 0.39 |
| Clay | 6.68 | 63.70 | 12.10 | 8.38 | — | 1.80 | 7.20 | 0.14 |
| Copper-smelting slag | 0.30 | 39.50 | 7.10 | 19.60 | 23.4 | 3.60 | 3.42 | 3.08 |

Calcium chloride—96% by mass of the principal compound
Potassium chloride—99.8% by mass of the principal compound
Sodium chloride—99.8% by mass of the principal compound.

The raw components are ground and intermixed by the procedure similar to that described in Example 1 hereinbefore. The weight rate of limestone:clay:slag:-CaCl$_2$:NaCl:KCl is 63:22:4:8:2:1 respectively.

The resulting slurry is delivered into a rotary furnace, wherein it is cooled at a temperature within the range of from 1,100° to 1,150° C.

The thus-produced cement clinker is cooled in a cooler with water cooling, then delivered to grinding to a residue of not more than 10% on a sieve with the hole diameter of 80 mcm. The calcined cement clinker contains, according to the data of X-ray quantitative analysis and optical microscopy, the following amounts of the components, percent by mass:
  highly-basic calcium silicate: 70 to 80
  low-basic calcium silicate: 15 to 10
  calcium aluminate and alumoferrite: 15 to 10.

Chemical analysis of the calcined cement clinker shows the content of 0.5% by mass of free calcium oxide and the following chemical composition of the resulting cement clinker as calculated for the oxides, percent by mass:
  $SiO_2$: 22.82
  $Al_2O_3$: 3.94
  $Fe_2O_3$: 5.71
  CaO: 65.25
  MgO: 2.28.

Tests of binding properties of the cement produced from the above raw mixture have shown that the compression strength of standard samples after 28 days of hardening is 465 kgf/cm$^2$.

EXAMPLE 5

A raw mixture is prepared consisting of the following components, percent by mass:
  lime component (limestone): 65.8
  argillaceous component (clay): 23.2
  ferrous component (pyrite cinders): 1.0
  calcium chloride (commercial): 7.9
  potassium chloride (commercial): 2.0
  sodium chloride (commercial): 0.1.

Chemical composition of the above-given components is given in Examples 1 and 4 hereinabove. The limestone has the following chemical composition, percent by mass: losses upon calcination 41.14; $SiO_2$ 3.38; $Al_2O_3$ 0.70; $Fe_2O_3$ 0.32; CaO 52.28; MgO 0.56; others—0.52.

The starting components are separately ground to a residue of 10% on a sieve with the hole diameter of 80 mcm and then intermixed and homogenized. The mixture is wetted with 7% of water and granulated to granules with a size of from 5 to 20 mm. The granulated material is calcined in a rotary furnace at a temperature within the range of from 1,100° to 1,150° C.

The resulting cement clinker is cooled in an air-cooled cooler and then delivered to grinding to a residue of not more than 10% on a sieve with the hole diameter of 80 mcm. The calcined cement clinker contains, according to the data of X-ray quantitative analysis and optical microscopy, the following amounts of the components, percent by mass:
  highly-basic calcium silicate: 60 to 65
  low-basic calcium silicate: 20 to 25
  calcium aluminate and alumoferrite: 20 to 10.

Chemical analysis of the cement clinker shows the absence of free calcium oxide and the following chemical composition of the clinker as calculated for the oxides, percent by mass:
  $SiO_2$: 22.6
  $Al_2O_3$: 3.2
  $Fe_2O_3$: 4.5
  CaO: 66.9
  MgO: 2.8.

Tests of binding properties of the cement produced from the above-described raw mixture have shown that compression strength of standard samples after 28 l days of hardening is 440 kgf/cm$^2$.

What is claimed is:

1. A method for the production of cement clinker which comprises, grinding a composition of lime component 55 to 63 percent by mass, a clay component 23 to 17 percent by mass, a ferrous component 4 to 1 percent by mass, calcium chloride 17.8 to 4 percent by mass, potassium chloride 0.1 to 7.5 percent by mass, sodium chloride, 0.1 to 7.5 percent by mass, and calcining the ground composition at a temperature of about 1,000° to 1,200° C.

2. A method for the production of cement clinker according to claim 1, in which cement is produced from said clinker, and said cement has a compression strength after 28 days of hardening of about 400 to 520 kgf./cm.

3. A method for the production of cement clinker according to claim 1, wherein said clinker contains substantially no free calcium oxide.

4. A method for production of cement clinker according to claim 1 in which said lime component is limestone.

5. A method for the production of cement clinker according to claim 1 in which said ferrous component is pyrite cinders or copper-smelting slag.

6. A method for production of cement clinker according to claim 1 in which said clay component is loess loam or clay.

7. A method for production of cement clinker according to claim 1 in which said lime component is limestone and said ferrous component is pyrite cinders or copper-smelting slag and said clay component is loess loam clay.

8. A method for production of cement clinker according to one of claims 1 to 7 in which the proportion of the components of said composition are such as to provide cement clinker which contains about 40 to 80% by mass of highly basic silicate, about 10–45% by mass of low-basic silicate and about 10 to 20% by mass of calcium aluminate and alumoferrite.

* * * * *